United States Patent
Ishihara

(10) Patent No.: US 8,678,128 B2
(45) Date of Patent: Mar. 25, 2014

(54) VEHICLE STEERING SYSTEM

(71) Applicant: JTEKT Corporation, Osaka (JP)

(72) Inventor: Atsushi Ishihara, Sakurai (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/771,743

(22) Filed: Feb. 20, 2013

(65) Prior Publication Data

US 2013/0220725 A1 Aug. 29, 2013

(30) Foreign Application Priority Data

Feb. 28, 2012 (JP) ................................. 2012-042121

(51) Int. Cl.
*B62D 5/00* (2006.01)
(52) U.S. Cl.
CPC ....................................... *B62D 5/006* (2013.01)
USPC .......................................................... 180/402
(58) Field of Classification Search
USPC .......................................................... 180/402
See application file for complete search history.

(56) References Cited

U.S. PATENT DOCUMENTS 5,369,583 A * 11/1994 Hazelden ......................... 701/48
2004/0026158 A1 * 2/2004 Rieth et al. ..................... 180/402

FOREIGN PATENT DOCUMENTS

JP A-10-278826 10/1998
JP A-2004-090784 3/2004

* cited by examiner

*Primary Examiner* — J. Allen Shriver, II
*Assistant Examiner* — Felicia L Brittman
(74) *Attorney, Agent, or Firm* — Oliff PLC

(57) ABSTRACT

A vehicle steering system includes a rotation restriction mechanism that restricts a rotation amount of a steering member within a predetermined angle. The rotation restriction mechanism includes at least one plate element that is interposed between a rotatable element, which is coaxially rotatable together with a rotary shaft of the steering member, and a non-rotatable element, and that is rotatable relative to the rotary shaft. Light projecting units are provided at one of the rotatable element and the non-rotatable element, and light receiving units are provided at the other one of the rotatable element and the non-rotatable element. The at least one plate element has light transmission portions that allows transmission of light that is emitted from the light projecting units and that enters the light receiving units when a rotation angle of the at least one plate element is a predetermined angle.

5 Claims, 9 Drawing Sheets

VEHICLE STEERING SYSTEM

INCORPORATION BY REFERENCE/RELATED APPLICATION

This application claims priority to Japanese Patent Application No. 2012-042121 filed on Feb. 28, 2012 the disclosure of which, including the specification, drawings and abstract, is incorporated herein by reference in its entirety.

BACKGROUND OF THE INVENTION

1. Field of the Invention

The invention relates to a vehicle steering system that steers steered wheels on the basis of an operation of a steering member.

2. Discussion of Background

In recent years, there has been a vehicle steering system having a so-called steer-by-wire system in which a steering member, such as a steering wheel, and steered wheels are not mechanically coupled to each other and part of a steering transmission system is formed of an electrical path. Such a vehicle steering system includes a steering mechanism that is connected to a steering member and a steered mechanism that steers tires with the use of a steered system motor that is used to steer steered wheels. The steered system motor is controlled on the basis of a steering angle that is detected by a steering angle sensor that detects a steering angle of the steering member.

In the thus configured steer-by-wire system, it is important to take fail-safe measures in a case where an abnormality occurs in the steering angle sensor. Particularly, when the steering angle sensor malfunctions, a steering operation is difficult even if the steered mechanism operates properly. Therefore, for example, a mechanical link that allows an easy steering operation even in the event of a malfunction of the steering angle sensor is provided as suggested in Japanese Patent Application Publication No. 2004-90784 (JP 2004-90784 A) or multiple sensors are provided as suggested in Japanese Patent Application Publication No. 10-278826 (JP 10-278826 A). However, the number of components increases and the cost increases.

SUMMARY OF THE INVENTION

The invention provides a vehicle steering system that is able to achieve an appropriate steering operation even in the event of a malfunction of a sensor of a so-called steer-by-wire system, with a low-cost and simple configuration.

According to a feature of an example of the invention, a vehicle steering system includes a rotation restriction mechanism that restricts a rotation amount of a steering member such that the rotation amount is equal to or smaller than a predetermined angle, the rotation restriction mechanism includes at least one plate element that is interposed between a rotatable element, which is coaxially rotatable together with a rotary shaft of the steering member, and a non-rotatable element, and that is rotatable with respect to the rotary shaft, a light projecting unit is provided at one of the rotatable element and the non-rotatable element, a light receiving unit is provided at the other one of the rotatable element and the non-rotatable element, and the at least one plate element has a light transmission portion that allows transmission of light that is emitted from the light projecting unit and that enters the light receiving unit when a rotation angle of the at least one plate element is a predetermined angle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
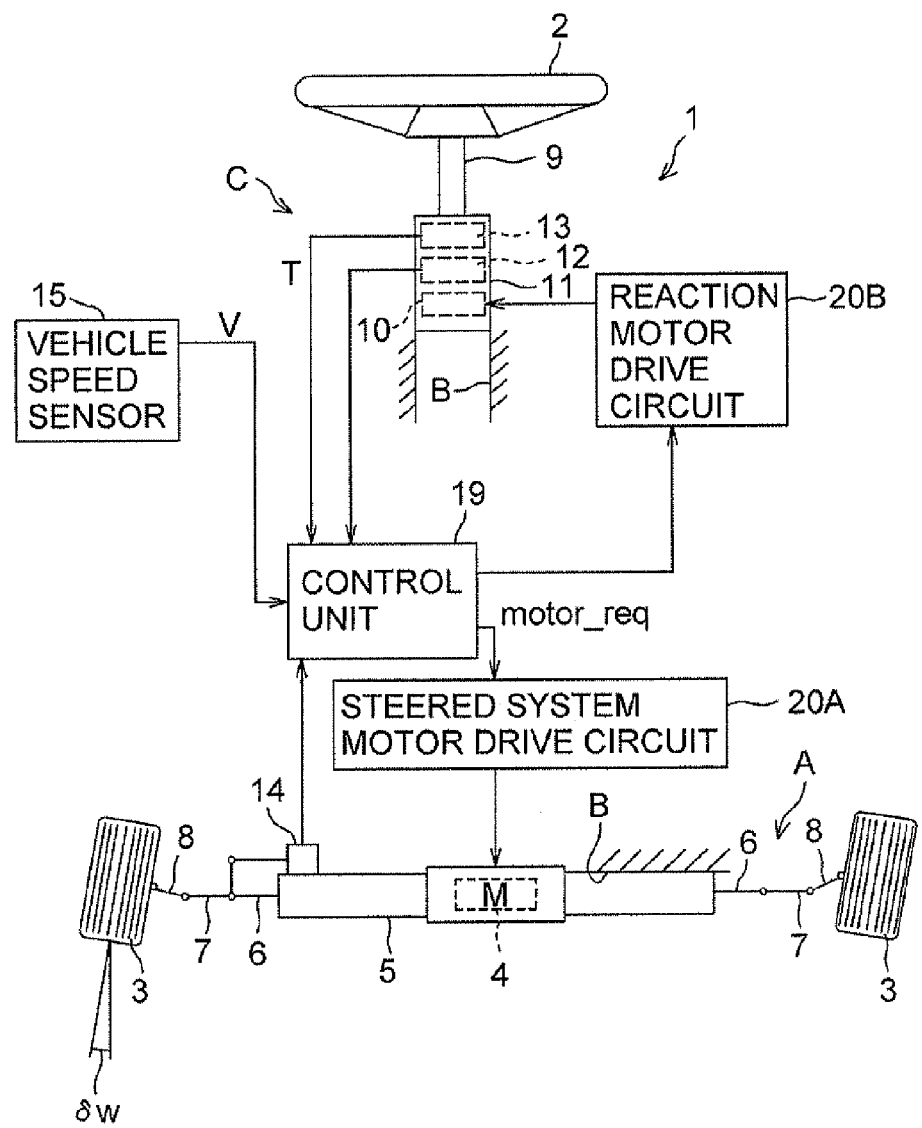
FIG. 1 is a view that shows the schematic configuration of a vehicle steering system according to an embodiment of the invention.

FIG. 1 is a view that shows the schematic configuration of a vehicle steering system according to an embodiment of the invention. As shown in FIG. 1, the vehicle steering system 1 constitutes a so-called steer-by-wire system in which a steering member 2, such as a steering wheel, is not mechanically coupled to steered wheels 3.

In the vehicle steering system 1, an operation of a steered system actuator 4 that is driven in response to a rotating operation of the steering member 2 is converted into a linear motion of a steered shaft 6 in the vehicle width direction. The steered shaft 6 is supported by a rack housing 5. The linear motion of the steered shaft 6 is converted into steered motions of the right and left steered wheels 3. In this way, a vehicle is steered. The position of the steering member 2, which corresponds to the position of the steered wheels 3 at the time when the vehicle is travelling straight ahead, is set as a steering neutral position.

The steered system actuator 4 includes a steered system motor M that is driven by a steered system motor drive circuit 20A, for example. The driving force of the steered system motor M (the rotational force of an output shaft) is converted into an axial linear motion of the steered shaft 6 by a ball screw mechanism provided in association with the steered shaft 6. The linear motion of the steered shaft 6 is transmitted to tie rods 7 coupled to respective ends of the steered shaft 6, and changes the orientation of the steered wheels 3 via knuckle arms 8.

The steered shaft 6, the tie rods 7 and the knuckle arms 8 constitute a steered mechanism A for steering the steered wheels 3. The rack housing 5 that supports the steered shaft 6 is fixed to a vehicle body B. The steering member 2 is coupled to a steering shaft 9 that is rotatably supported by the vehicle body B. A reaction motor 10, such as a brushless motor, is fitted to the steering shaft 9. The reaction motor 10 is used to apply reaction force, which is transmitted from a road surface, or the like, to the steered wheels 3, to the steering member 2, as steering reaction force. The reaction motor 10 is accommodated in a column housing 11 that is fixed to the vehicle body B, and is driven by a reaction motor drive circuit 20B.

The vehicle steering system 1 includes a steering angle sensor 12 that is provided in association with the steering shaft 9. The steering angle sensor 12 is used to detect the steering angle of the steering member 2. A torque sensor 13 is provided on the steering shaft 9. The torque sensor 13 is used to detect a steering torque T applied to the steering member 2. The steering member 2, the steering shaft 9 and the steering angle sensor 12 constitute a steering mechanism C. The steered mechanism A includes a steered angle sensor 14 that is provided in association with the steered shaft 6. The steered angle sensor 14 is used to detect the steered angle of the steered wheels 3.

In addition to these sensors, a vehicle speed sensor 15 that detects a vehicle speed V is provided. The vehicle speed V may be detected on the basis of a vehicle speed signal that is acquired through an in-vehicle LAN (CAN) without providing the vehicle speed sensor 15. Detection signals from these sensors 12 to 15 are input into a control unit 19 that serves as a control unit that is an electronic control unit including a microcomputer.

The control unit 19 sets a target steered angle on the basis of the steering angle detected by the steering angle sensor 12 and the vehicle speed V detected by the vehicle speed sensor 15. The control unit 19 executes drive control (steered system control) on the steered system motor M of the steered system actuator 4, with the use of the steered system motor drive circuit 20A on the basis of a deviation between the target steered angle and a steered angle δw detected by the steered angle sensor 14.

The control unit 19 executes drive control (reaction control) on the reaction motor 10 with the use of the reaction motor drive circuit 20B such that an appropriate reaction force in a direction opposite to a direction in which the steering member 2 is steered is applied to the steering member 2.

Figure 2:
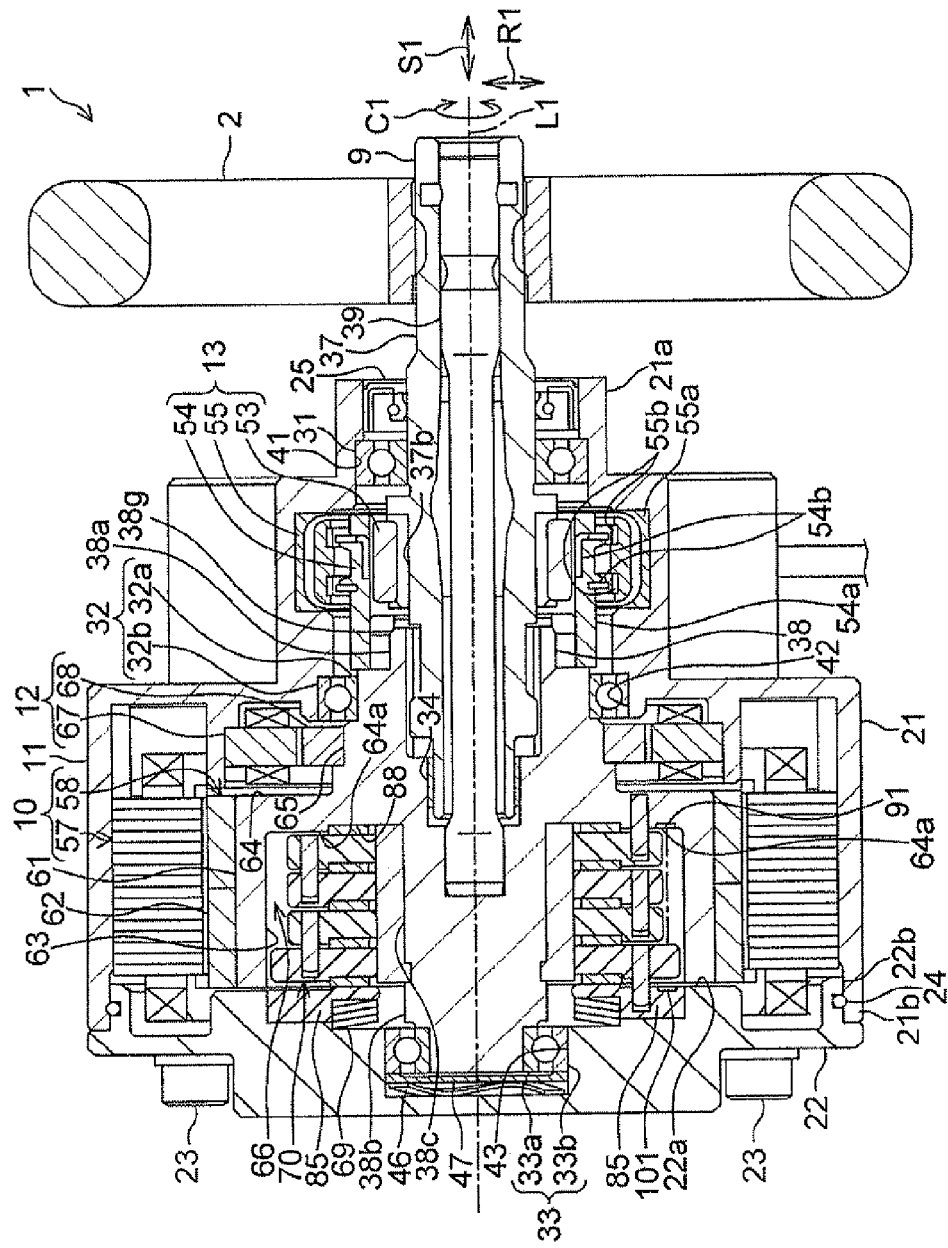
FIG. 2 is a sectional view of a housing that accommodates, for example, a rotation restriction mechanism, which restricts an amount of rotation of a steering member and a reaction motor.

FIG. 2 is a sectional view of the column housing 11 and portions near the column housing 11. The column housing 11 is made of an aluminum alloy. The column housing 11 includes a main housing 21 and a cover housing 22. The main housing 21 is formed in a cylindrical shape having one end portion 21a and the other end portion 21b. The cover housing 22 closes the other end portion 21b of the main housing 21.

The cover housing 22 is fixed to the other end portion 21b of the main housing 21 with screws 23. An annular protruding portion 22b is formed at a radially outer portion of the cover housing 22. The annular protruding portion 22b is fitted to the inner periphery of the other end portion 21b of the main housing 21. An annular groove is formed in the outer periphery of the annular protruding portion 22b, and an O ring 24 is arranged in the annular groove.

The O ring 24 inhibits entry of foreign matter, such as rainwater and dust, into the inside of the column housing 11 through a gap between the cover housing 22 and the main housing 21. As will be described later, an oil seal 25 is arranged between the main housing 21 and the steering shaft 9. By employing a structure that inhibits entry of foreign matter into the inside of the column housing 11 as described above, it is not necessary to arrange the column housing 11 in a hermetically sealed space.

The steering shaft 9 couples the reaction motor 10 to the steering member 2. Part of the steering shaft 9 protrudes from the column housing 11. The steering shaft 9 is rotatably supported by the column housing 11 via a first bearing 31, a second bearing 32 and a third bearing 33.

The steering shaft 9 includes a first shaft 37, a second shaft 38 and a torsion bar 39. The first shaft 37 and the second shaft 38 are arranged coaxial with each other. The torsion bar 39 couples the first shaft 37 to the second shaft 38. The steering member 2 is coupled to one end portion of the first shaft 37 so as to be rotatable together with the first shaft 37. The oil seal 25 is arranged between an intermediate portion of the first shaft 37 and the one end portion 21a of the main housing 21. The oil seal 25 liquid-tightly seals a gap between the one end portion 21a of the main housing 21 and the first shaft 37.

The intermediate portion of the first shaft 37 is rotatably supported in a first bearing retaining hole 41 formed in the one end portion 21a of the main housing 21 via the first bearing 31. The other end portion of the first shaft 37 is inserted in the second shaft 38, and is rotatably supported by the second shaft 38 via a fourth bearing 34.

One end portion 38a of the second shaft 38 and the intermediate portion of the first shaft 37 respectively have facing portions 38g, 37b that are located next to each other and face each other in an axial direction S1 of the steering shaft 9. The torque sensor 13 is arranged at the facing portions 38g, 37b.

When torque acts between the first shaft 37 and the second shaft 38, the torsion bar 39 is able to twist within a small angular range on the basis of the magnitude of the torque. By detecting a relative rotation amount between the first shaft 37 and the second shaft 38 at this time with the use of the torque sensor 13, it is possible to detect a torque T that is applied to the steering shaft 9.

An inner ring 32a of the second bearing 32 is press-fitted to an intermediate portion 38c of the second shaft 38. The second shaft 38 is rotatably supported in a second bearing retaining hole 42 of the main housing 21 via the second bearing 32. The other end portion 38b of the second shaft 38 is inserted in a third bearing retaining hole 43 formed in an end wall 22a of the cover housing 22. The other end portion 38b of the second shaft 38 is rotatably supported in the third bearing retaining hole 43 via the third bearing 33.

A preload is applied to the second bearing 32 and third bearing 33. Specifically, a preload application member 46 and a receiving member 47 are arranged between the cover housing 22 and the third bearing 33. The preload application member 46 is, for example, a wave washer spring. The receiving member 47 is formed in a disc shape. The receiving member 47 is arranged next to an outer ring 33b of the third bearing 33 in the axial direction S1, and is in contact with the outer ring 33b. The outer ring 33b of the third bearing 33 is fitted in the third bearing retaining hole 43 so as to be relatively movable in the axial direction S1 of the steering shaft 9. The inner ring 33a of the third bearing 33 is press-fitted to the other end portion 38b of the second shaft 38.

The inner ring 32a of the second bearing 32 is press-fitted to the intermediate portion 38c of the second shaft 38. The outer ring 32b of the second bearing 32 is fitted in the second bearing retaining hole 42 so as to be relatively movable in the axial direction S1. One side face of the outer ring 32b is received by the main housing 21.

With the above-described configuration, elastic repulsive force due to compression of the preload application member 46 is received by the main housing 21 via the receiving member 47, the outer ring 33b and inner ring 33a of the third bearing 33, the second shaft 38 and the inner ring 32a and outer ring 32b of the second bearing 32. In this way, a preload is applied to the second bearing 32 and the third bearing 33.

The torque sensor 13 is arranged between the first bearing 31 and the second bearing 32. The torque sensor 13 includes a multipolar magnet 53, a first ring unit 54 and a second ring unit 55. The multipolar magnet 53 is formed of a permanent magnet fixed to the facing portion 37b of the first shaft 37. The first ring unit 54 is fixed to the facing portion 38g of the second shaft 38. The second ring unit 55 is fixed to the column housing 11. The first ring unit 54 includes an annular synthetic resin member 54a and a pair of annular magnetic yokes 54b. The synthetic resin member 54a is fixed to the facing portion 38g of the second shaft 38. The magnetic yokes 54b are embedded in the synthetic resin member 54a, and are arranged within a magnetic field of the multipolar magnet 53.

The second ring unit 55 is formed in an annular shape so as to surround the first ring unit 54. The second ring unit 55 includes a synthetic resin member 55a, a pair of magnetic flux concentration rings 55b and a Hall IC (not shown). The synthetic resin member 55a is fixed to the main housing 21. The magnetic flux concentration rings 55b and the Hall IC are embedded in the synthetic resin member 55a. The reaction motor 10, the steering angle sensor 12 and the torque sensor 13 are accommodated in the column housing 11.

Figure 3:
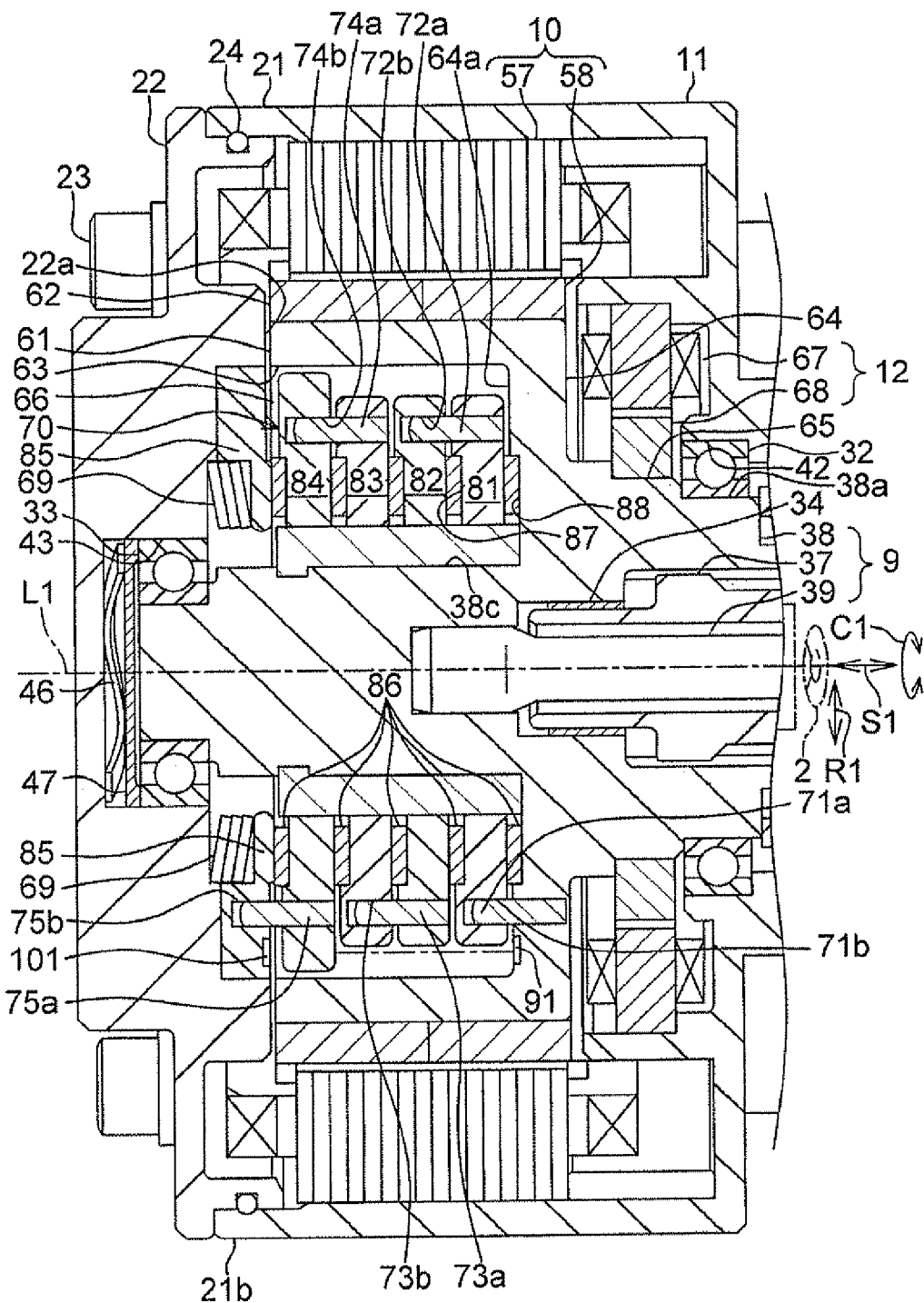
FIG. 3 is a partially enlarged sectional view of FIG. 2, showing the rotation restriction mechanism and portions near the rotation restriction mechanism.

FIG. 3 is an enlarged view of the reaction motor 10 and portions near the reaction motor 10 shown in FIG. 2. The reaction motor 10 is arranged at a position close to the other end portion 21b of the main housing 21, and is located next to the cover housing 22. Thus, when the cover housing 22 is removed from the main housing 21, substantially the entirety of the reaction motor 10 is exposed to an opening in the other end portion 21b of the main housing 21. Therefore, it is easy to perform work for installing the reaction motor 10 inside the main housing 21 or maintenance work on the reaction motor 10.

The reaction motor 10 includes a cylindrical rotor 58 and a stator 57 that surrounds the rotor 58. The axial direction, the radial direction and the circumferential direction of the rotor 58 coincide with the axial direction S1, the radial direction R1 and the circumferential direction C1 of the steering shaft 9, respectively. The outer periphery of the stator 57 is fixed to the inner periphery of the main housing 21 by heat shrink. The rotor 58 is coupled to the steering member 2 via the steering shaft 9 so as to be rotatable together with the steering member 2. The rotor 58 includes a cylindrical rotor core 61 and a permanent magnet 62. The rotor core 61 extends in the axial direction S1. The permanent magnet 62 is fixed to the outer periphery of the rotor core 61.

The rotor core 61 is formed integrally with the second shaft 38 of the steering shaft 9 by using a single material. The rotor core 61 includes a cylindrical portion 63, an end wall portion 64 and an extended portion 65. The cylindrical portion 63 is arranged outward of the steering shaft 9 in the radial direction R1. The end wall portion 64 extends inward in the radial direction R1 from one end portion of the cylindrical portion 63. The extended portion 65 extends from the end wall portion 64 toward the one end portion 38a of the second shaft 38 (toward the torque sensor 13). The extended portion 65 is formed integrally with the intermediate portion 38c of the second shaft 38. The end wall portion 64 is formed in an annular plate shape, and surrounds part of the fourth bearing 34.

Torque that is generated in the reaction motor 10 by the magnetic action between the stator 57 and the rotor 58 is transmitted to the second shaft 38 via the end wall portion 64. The end wall portion 64 is arranged so as to substantially overlap with the fourth bearing 34 in the axial direction S1. Therefore, it is possible to suppress of occurrence of misalignment of the end wall portion 64 with respect to the first shaft 37.

The other end portion of the cylindrical portion 63 is located next to the end wall 22a of the cover housing 22. The cylindrical portion 63 is surrounded by the stator 57. The cylindrical portion 63 surrounds the intermediate portion 38c of the second shaft 38. With the above-described configuration, an accommodation groove portion 66 surrounded by the cylindrical portion 63, the end wall portion 64 and the second shaft 38 is formed. The accommodation groove portion 66 is an annular groove portion, and is open toward the cover housing 22.

The permanent magnet 62 is fixed to the outer periphery of the cylindrical portion 63 of the rotor core 61. The steering angle sensor 12 is arranged so as to be aligned with the accommodation groove portion 66. The steering angle sensor 12 is formed of a resolver, and includes a resolver stator 67 and a resolver rotor 68. The resolver stator 67 is arranged between the end wall portion 64 and the second bearing 32 in the axial direction S1, and is fixed to the main housing 21. The resolver rotor 68 is surrounded by the resolver stator 67. The resolver rotor 68 is fixed to the extended portion 65 of the rotor core 61.

A rotation restriction mechanism 70 is accommodated in the column housing 11. The rotation restriction mechanism 70 functions to restrict the rotation angle of the steering shaft 9 such that the rotation angle is equal to or smaller than a predetermined angle. The steering shaft 9 is a rotary shaft of the steering member 2 that is subjected to multiple rotation operation for steering. In the steer-by-wire vehicle steering system 1 according to the present embodiment, the steering member 2 is not restricted by the steered mechanism A. Then, in order to avoid the situation where the steering member 2 is operated beyond an operation limit of the steered mechanism A, the rotation restriction mechanism 70 restricts the rotation angle of the steering member 2 such that the rotation angle is equal to or smaller than the predetermined angle that corresponds to the operation limit.

As shown in FIG. 3, most of the elements of the rotation restriction mechanism 70 are arranged in the accommodation groove portion 66 that is a space radially inward of the rotor core 61. The rotation restriction mechanism 70 includes an embedded fixed plate 85, a plurality of plate elements 81 to 84 and a bottom wall 64a of the rotor core 61. The embedded fixed plate 85 serves as a non-rotatable element embedded in the end wall 22a of the cover housing 22. The plate elements 81 to 84 are coaxially supported by the second shaft 38 of the steering shaft 9, which serves as the rotary shaft of the steering member 2, and are rotatable and movable in the axial direction S1 with respect to the second shaft 38. The bottom wall 64a serves as a rotatable element. The embedded fixed plate 85 that serves as the non-rotatable element and the bottom wall 64a that serves as the rotatable element are arranged on respective sides of the plate elements 81 to 84 in the axial direction S1.

The rotation restriction mechanism 70 includes a plurality of coupling elements (described later) that respectively couple adjacent elements so as to restrict a relative rotation amount between the adjacent elements among the embedded fixed plate 85 that serves as the non-rotatable element, the plate elements 81 to 84 and the bottom wall 64a that serves as the rotatable element. The rotation restriction mechanism 70 includes a plurality of friction plates 86 that serve as a plurality of friction application elements. The friction plates 86 each apply friction resistance to relative rotation between the adjacent elements.

The coupling elements are respectively formed of pin-shaped protrusions 71a to 75a and closed-end engagement grooves 71b to 75b. The protrusions 71a to 75a each are provided at one of the corresponding adjacent elements so as to protrude in the axial direction S1. The engagement grooves 71b to 75b each are provided at the other one of the corresponding adjacent elements so as to be engaged with a corresponding one of the protrusions 71a to 75a, and extend in the circumferential direction C1. Each of the protrusions 71a to 75a contacts a corresponding one of restricting portions 81d to 85d or a corresponding one of 81e to 85e (see FIG. 4A to FIG. 4E). The restricting portions 81d to 85d and 81e to 85e are located at respective ends of the engagement grooves 71b to 75b, respectively. In this way, a relative rotation amount between adjacent elements is restricted.

Each of the plate elements 81 to 84 is formed of an annular plate, and is arranged between the peripheral wall of the cylindrical portion 63 and the intermediate portion 38c (for example, a metal bush) of the second shaft 38. Each of the plate elements 81 to 84 is rotatably fitted on the intermediate portion 38e, and is movably supported in the axial direction S1. The protrusion 71a is formed so as to protrude from the bottom wall 64a that serves as the rotatable element. The protrusions 72a to 75a are respectively formed so as to protrude from one end faces of the corresponding plate elements 81 to 84, and the engagement grooves 71b to 74b are respectively formed so as to extend in the circumferential direction C1 in regions in which the corresponding protrusions 72a to 75a are not formed. The closed-end engagement groove 75b is formed in the embedded fixed plate 85 so as to extend in the circumferential direction C1. The embedded fixed plate 85 serves as the non-rotatable element.

Each of the protrusions 71a to 75a may be provided separately from a corresponding one of the bottom wall 64a and the plate elements 81 to 84 and part of the protrusions 71a to 75a may be fixedly inserted in a predetermined fixing hole of a corresponding one of the bottom wall 64a and the plate elements 81 to 84. Although not shown in the drawing, each of the protrusions 71a to 75a may be integrally formed with a corresponding one of the bottom wall 64a and the plate elements 81 to 84 from a single material. At least one end faces (in the present embodiment, end faces from which the protrusions 72a to 75a protrude) of the plate elements 81 to 84 each have an annular receiving recessed portion 87 that receives the corresponding friction plate 86. In addition, the bottom wall 64a of the rotor core 61 has an annular receiving recess 88 (see FIG. 3). Each of the receiving recessed portions 87, 88 receives a corresponding one of the friction plates 86, and the outer periphery of each friction plate 86 is rotatably supported by the peripheral wall face of the corresponding one of the receiving recessed portions 87, 88.

The protrusion 71a provided at the bottom wall 64a that serves as the rotatable element is slidably fitted in the closed-end engagement groove 71b formed in the plate element 81. In addition, the protrusions 72a to 74a respectively provided at the plate elements 81 to 83 are respectively slidably fitted in the engagement grooves 72b to 74b formed in the plate elements respectively adjacent to the plate elements 81 to 83. The protrusion 75a provided at the plate element 84 is slidably fitted in the engagement groove 75b formed in the embedded fixed plate 85 fixed to the end wall 22a of the column housing 11. The embedded fixed plate 85 serves as the non-rotatable element.

As shown in FIG. 4A to FIG. 4E, the ranges in which the engagement grooves 71b to 75b are formed to extend in the circumferential direction C1 are set such that the movable range of each of the protrusions 71a to 75a, which engages with a corresponding one of the engagement grooves 71b to 75b (range in which each of the protrusions 71a to 75a moves between the restricting portions at both ends of a corresponding one of the engagement grooves 71b to 75b), becomes δ1 (referred to as restricting angle, see FIG. 4A) in relative rotation angle between the adjacent elements. In this case, a maximum rotation angle δmax of the steering shaft 9 from the left to the right is obtained as follows.

$$\delta max = \delta 1 \times 4$$

Therefore, by setting the restricting angle δ1 of each of the protrusions 71a to 75a or changing the number of the plate elements, it is possible to restrict the maximum rotation angle δmax of the steering shaft 9 to a desired multiple rotation range. For example, when the restricting angle δ1 is 306° and the number of the plate elements is four, the rotation amount of the steering shaft 9 is restricted such that the rotation amount is equal to or smaller than 1224° (maximum rotation angle).

An urging member (an annular plate spring in the present embodiment) 69 is provided at the end wall 22a of the cover housing 22. The urging member 69 elastically urges the embedded fixed plate 85, which serves as the non-rotatable element, toward the friction plate 86. With the use of the urging member 69, it is possible to elastically hold a laminated unit between the embedded fixed plate 85 and the bottom wall 64a (rotatable element) of the rotor 61. The laminated unit includes the plate elements 81 to 84 and the friction plates 86. Each of the friction plates 86 is interposed between corresponding adjacent elements such that friction resistance against relative rotation between the corresponding adjacent elements is applied to the corresponding adjacent elements. That is, the urging member 69 collectively applies an axial preload to the plate elements 81 to 84, the embedded fixed plate 85 and the friction plates 86 of the laminated unit. By so doing, the embedded fixed plate 85 and each of the friction plates 86 are able to apply friction resistance having a desired magnitude to members that contact the embedded fixed plate 85 and the friction plates 86.

Figure 4A:
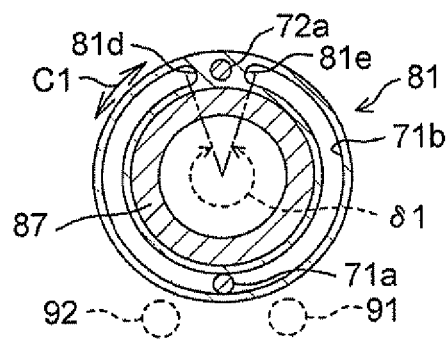
FIG. 4A to FIG. 4E are plan views of plate elements that constitute the rotation restriction mechanism.
Figure 4B:
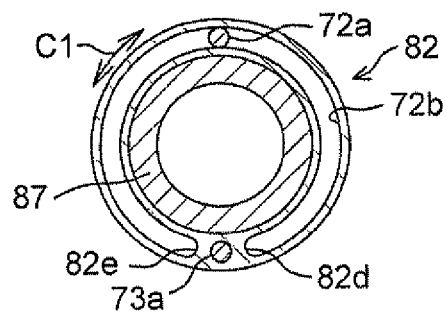
Figure 4C:
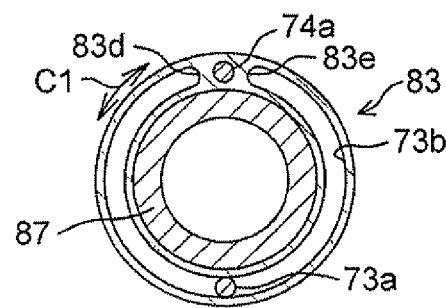
Figure 4D:
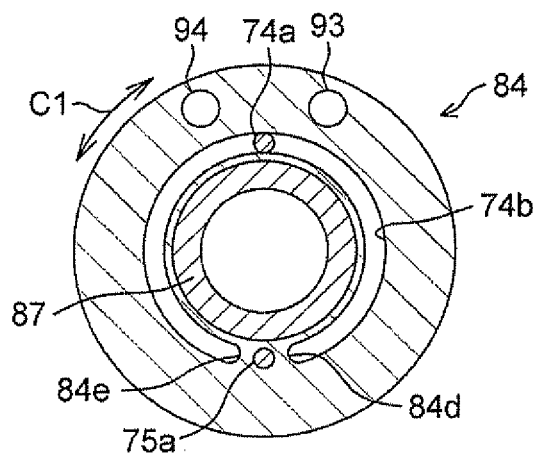
Figure 4E:
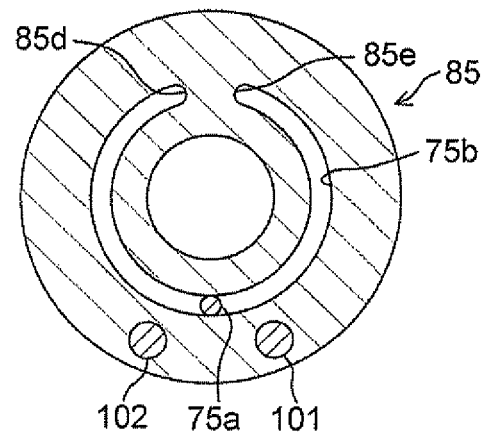
Figure 5A:
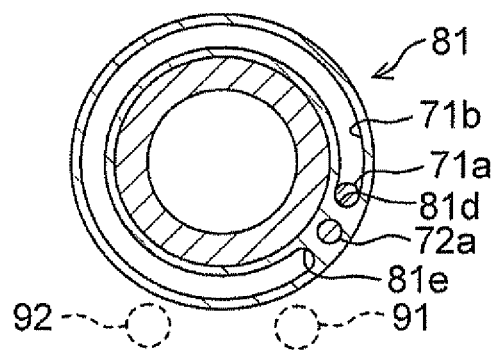
FIG. 5A to FIG. 5D are plan views of the plate elements, for illustrating restriction on rotation of a rotor imposed by the rotation restriction mechanism.
Figure 5B:
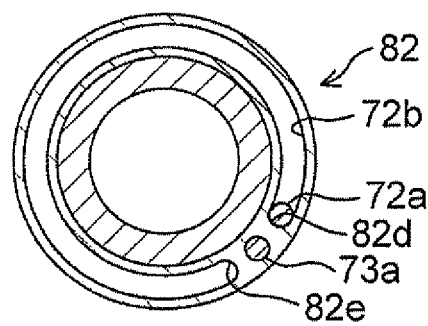
Figure 5C:
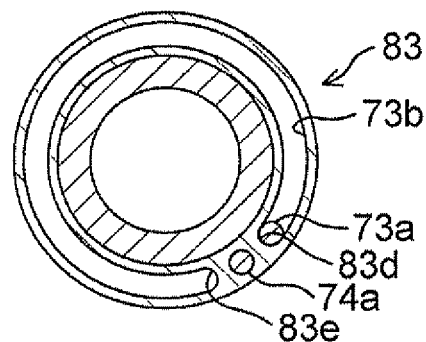
Figure 5D:
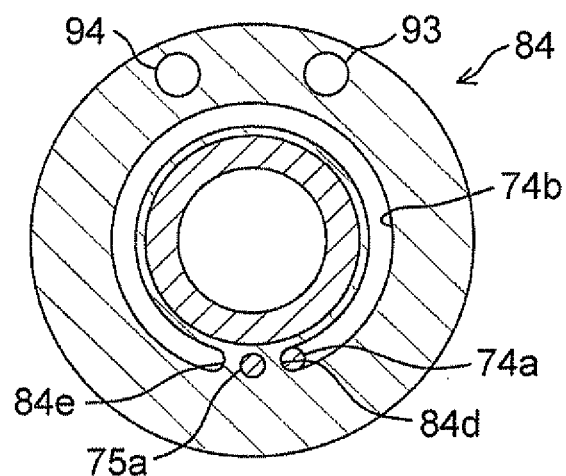

Two light projecting units 91, 92 are provided on the bottom wall 64a, which serves as the rotatable element, at positions on respective sides of the protrusion 71a, and light receiving units 101, 102 are provided on the embedded fixed plate 85, which serves as the non-rotatable element, at positions close to the end wall 22a of the column housing 11 (only the light projecting unit 91 and the light receiving unit 101 are shown in FIG. 2 and FIG. 3). The light receiving units 101, 102 respectively receive rays of light, which are emitted from the light projecting units 91, 92. As shown in FIG. 4D, the plate element 84 has transmission holes 93, 94 through which the light is transmitted from the light projecting units 91, 92 to the light receiving units 101, 102.

The radius of each of the plate elements 81 to 83 is set smaller than the radius of the plate element 84 in which the transmission holes 93, 94 are formed such that, irrespective of the rotational positions of the plate elements 81 to 83, transmission of light from the light projecting units 91, 92 to the light receiving units 101, 102 is not interrupted. The light receiving unit 101 outputs a detection voltage V1 upon reception of the light from the light projecting unit 91, and the light receiving unit 102 outputs a detection voltage V2 upon reception of the light from the light projecting unit 92. Each of the detection voltages V1, V2 is input into the control unit 19.

The schematic configuration of the vehicle steering system 1 is described above. Next, an example of the operation of the vehicle steering system 1 will be described. As shown in FIG. 3 and FIG. 4A to FIG. 4E, when the steering member 2 is located at the steering neutral position, the protrusions 71a to 75a are engaged with the corresponding engagement grooves 71b to 75b in a state where rotation is not restricted.

A case where a driver rotates the steering member 2 from the steering neutral position by the maximum angle in the clockwise direction will be described below. Hereinafter, a rotation direction signifies a rotation direction when the steering member 2 is seen from the driver side. In this case, the driver rotates the steering member 2 from the steering neutral position in the clockwise direction. By so doing, the steering shaft 9 and the rotor 58 of the reaction motor 10 rotate in the clockwise direction in association with the steering member 2.

In response to this, as shown in FIG. 5A to FIG. 5D, the following operations (a) to (e) occur at the same time or occur temporally one after another.

(a) The protrusion 71a contacts the one end portion 81d of the engagement groove 71b of the plate element 81.
(b) The plate element 81 rotates in the clockwise direction, and the protrusion 72a of the plate element 81 contacts the one end portion 82d of the engagement groove 72b of the plate element 82.
(c) The plate element 82 rotates in the clockwise direction, and the protrusion 73a contacts the one end portion 83d of the engagement groove 73b of the plate element 83.
(d) The plate element 83 rotates in the clockwise direction, and the protrusion 74a contacts the one end portion 84d of the engagement groove 74b of the plate element 84.
(e) The plate element 84 rotates in the clockwise direction, and the protrusion 75a contacts the one end portion 85d of the engagement groove 75b of the embedded fixed plate 85 that serves as the non-rotatable element. Rotation of the embedded fixed plate 85 that serves as the non-rotatable element is restricted. Through the above operations, rotation of the plate elements 81 to 84 in the clockwise direction beyond a restricted rotation angle is mechanically restricted. Note that, the temporal order of the rotation operations (a) to (e) of the plate elements 81 to 84 is not particularly limited.

Figure 6:
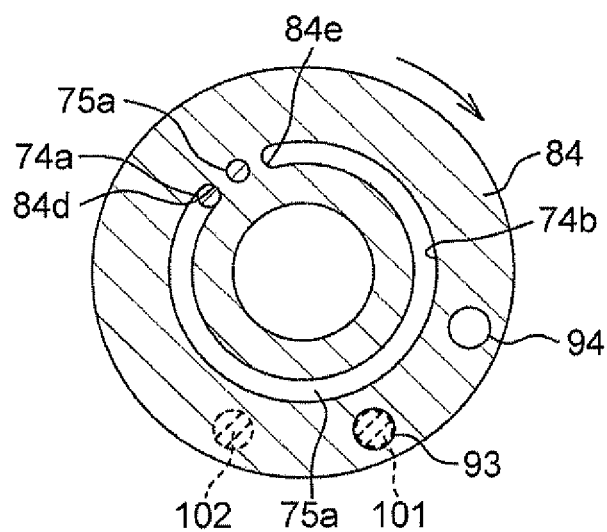
FIG. 6 is a plan view of an embedded fixed plate that serves as a non-rotatable element, for illustrating restriction on the rotor imposed by the rotation restriction mechanism.

In a state where the plate element 84 has been rotated in the clockwise direction to a mechanically restricted position as in the case of the above (e), as shown in FIG. 6, the transmission hole 93 overlaps with the light receiving unit 101 when viewed from the optical axis direction of light that is emitted from the light projecting unit 91. Thus, the light that is emitted from the light projecting unit 91 is blocked by neither the plate elements 81 to 83 nor the plate element 84, and is received by the light receiving unit 101 through the transmission hole 93.

When the steering member 2 is rotated in the counterclockwise direction in order to steer the vehicle to the left, rotation of the steering member 2 is restricted as in the case described above. That is, the protrusions 71a to 75a respectively contact the other end portions 81e to 85e of the corresponding engagement grooves 71b to 75b. As a result, rotation of the steering member 2 in the counterclockwise direction is restricted. At this time, in a state where the plate element 84 has been rotated in the counterclockwise direction to a mechanically restricted position, the transmission hole 94 overlaps with the light receiving unit 102 when viewed from the optical axis direction of light that is emitted from the light projecting unit 92. Thus, the light that is emitted from the light projecting unit 92 is blocked by neither the plate elements 81 to 83 nor the plate element 84, and is received by the light receiving unit 102 through the transmission hole 94.

Figure 7:
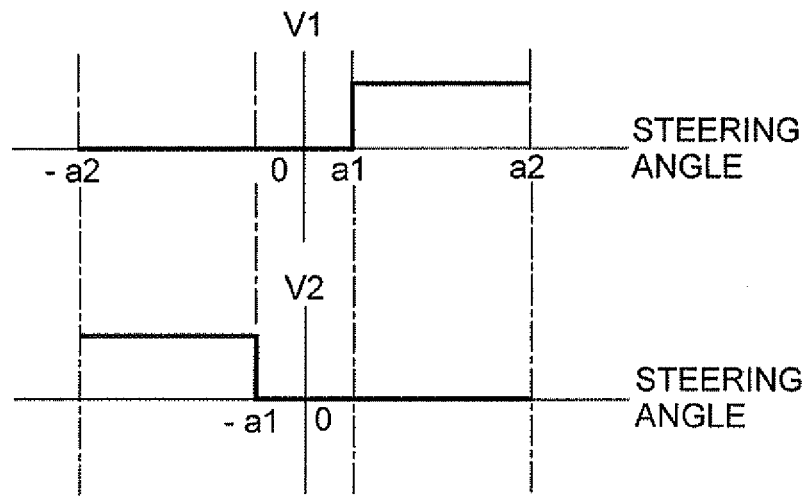
FIG. 7 is a graph that shows the correlation between detection voltages of respective light receiving units and a steering angle.
Figure 8:
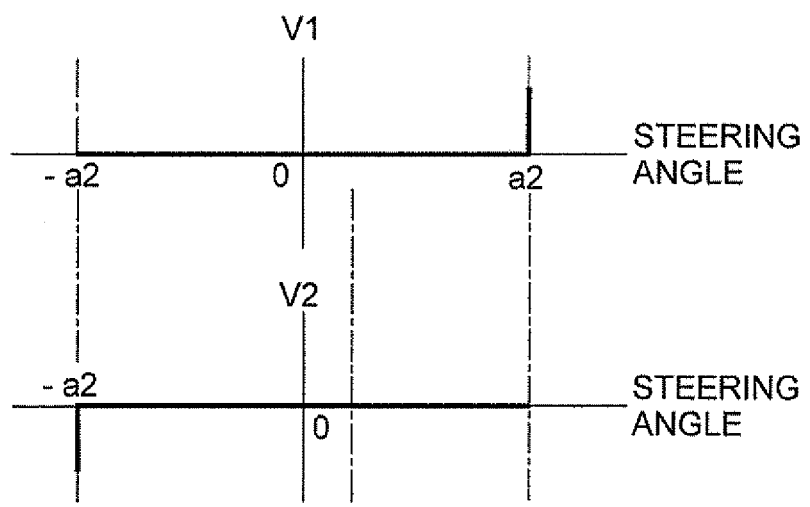
FIG. 8 is a graph that shows the correlation between detection voltages of the respective light receiving units and a steering angle.

FIG. 7 and FIG. 8 are graphs that show the correlation between a detection voltage V1 of the light receiving unit 101 and a steering angle of the steering member 2 and the correlation between a detection voltage V2 of the light receiving unit 102 and a steering angle of the steering member 2, respectively. FIG. 7 is a graph that shows the correlations between a steering angle of the steering member 2 and detection voltages V1, V2 at the time when the plate element 84 closest to the non-rotatable element 85 has rotated to a restricting position in the clockwise direction or the counter clockwise direction prior to the time when the other plate elements 81 to 83 are rotated to the restricting positions. When the steering angle of the steering member 2 reaches an angle a1 after the steering member 2 is rotated to the right from the neutral position, the detection voltage V1 shifts from the low level to the high level. When the steering angle of the steering member 2 reaches an angle −a after the steering member 2 is rotated to the left from the neutral position, the detection voltage V2 shifts from the low level to the high level. Each of the detection voltages V1, V2 is at the low level when the steering member 2 is at the neutral position or the steering angle of the steering member 2 is within the range of −a1 to a1. The angle a1 is equal to half of the restricting angle δ1 (for example, when the restricting angle δ1 is 306°, the angle a1 is 153°).

FIG. 8 is a graph that shows the steering angle of the steering member 2 when the plate element 84 closest to the non-rotatable element 85 has rotated to a restricting position in the clockwise direction or counterclockwise direction temporally after the other plate elements 81 to 83 are rotated to the restricting positions. The steering angle of the steering member 2 at the time when the plate element 84 has rotated to the restricting position is indicated by a2 and −a2. In this case, at the time when the plate element 84 has rotated to the restricting position in the clockwise direction or counterclockwise direction, not only the plate element 84 but also the other plate elements 81 to 83 have reached the restricting angle δ1. Therefore, the steering angles a2 and −a2 correspond to operation limits of the rotation angle of the steering member 2 that is restricted by the rotation restriction mechanism 70. That is, an angle a2 is half of the maximum rotation angle δmax (for example, when the restricting angle δmax is 1224°, the angle a2 is 612°). By monitoring the detection voltages V1, V2 of the sensors as described above, it is possible to detect at least the steering direction of the steering member 2.

Figure 9:
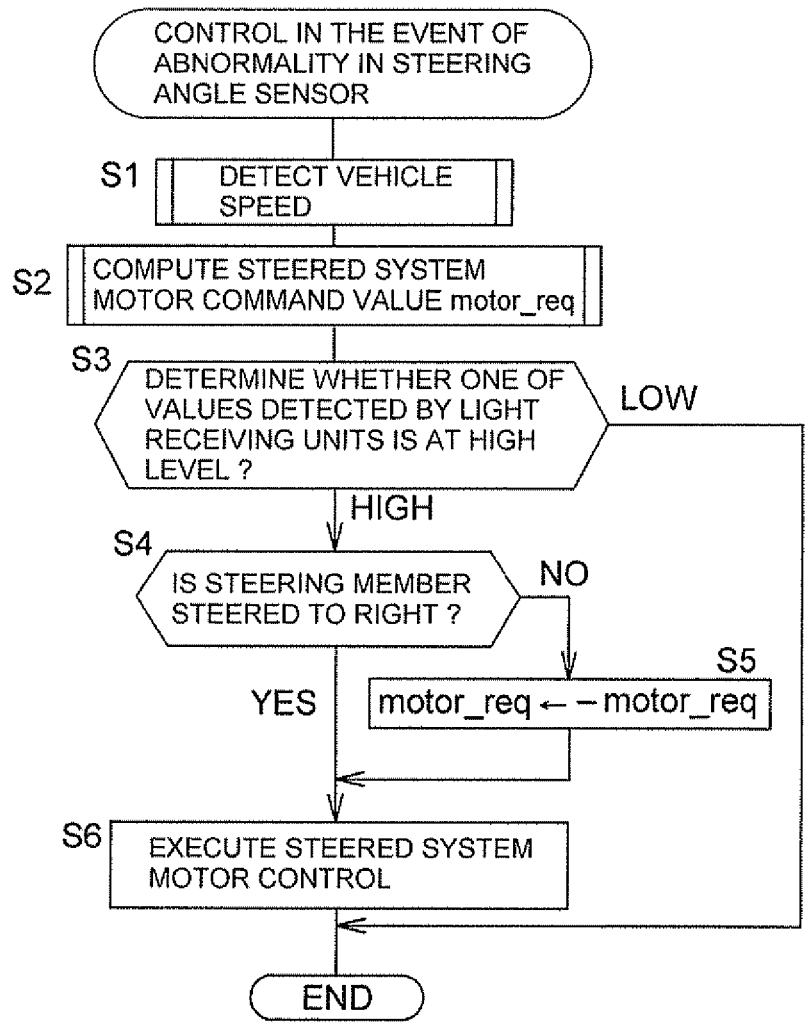
FIG. 9 is a flowchart for illustrating a steered system control process in the event of an abnormality in a steering angle sensor, which is executed by a control unit.

FIG. 9 is a flowchart for illustrating a steered system control process that is executed by the control unit 19 in the event of an abnormality of the steering angle sensor 12. First, the process that is executed by the control unit 19 when the steering angle sensor 12 operates properly will be briefly described. The control unit 19 sets a current command value or rotation speed command value for the steered system motor M on the basis of the steering angle of the steering member 2, which is detected by the steering angle sensor 12, and the vehicle speed V detected by the vehicle speed sensor 15. Then, the control unit 19 executes drive control on the steered system motor M on the basis of the current command value or the rotation speed command value. As a result, torque for moving the steered shaft 6 in a direction corresponding to the operation direction and operation amount of the steering member 2 is output from the steered system motor M, and appropriate steering based on a travelling state of the vehicle and the operation mode of the steering member 2 is achieved. In addition, at the same time, the control unit 19 executes drive control (reaction control) on the reaction motor 10 with the use of the reaction motor drive circuit 20B such that an appropriate reaction force in a direction opposite to the direction in which the steering member 2 is steered is applied to the steering member 2 on the basis of the detection signals output from the sensors 12 to 15.

When an abnormality occurs in the steering angle sensor 12 while the drive control is executed on the steered system motor M, the vehicle speed is detected by the vehicle speed sensor 15 or through the in-vehicle LAN (step S1). The detected vehicle speed also includes a vehicle speed when the vehicle backs up. Subsequently, a steered system motor command value motor_req for driving the steered system motor M is computed (step S2). Here, the steered system motor command value motor_req has a positive or negative sign. The steered system motor command value motor_req is positive when the vehicle is turned to the right; whereas the steered system motor command value motor_req is negative when the vehicle is turned to the left. The steered system motor command value motor_req varies depending on whether the current command value is set or the rotation speed command value is set in order to drive the steered system motor M. When the current command value is selected, the steered system motor command value motor_req is a current command value motor_current; whereas, when the rotation speed command value is selected, the steered system motor command value motor_req is a rotation speed command value motor speed. A method of calculating the command value will be described later with reference to FIG. 10.

The detection voltages V1, V2 of the light receiving units 101, 102 of the rotation restriction mechanism 70 are determined (step S3). When one of the sensor voltages V1, V2 is at the high level, the process proceeds to step S4, and the steering direction of the steering member 2 is detected. The detected steering direction in the case of FIG. 7 includes three directions, that is, left (−a2 to −a1), neutral or close to neutral (−a1 to 0 to a1) and right (a1 to a2). The detected steering direction in the case of FIG. 8 includes three directions, that is, left (−a2), neutral or closer to neutral (−a2 to 0 to a2) and right (a2).

When the sensor voltage V1 is at the high level, it is determined that the vehicle is steered to the right, and then the process proceeds to step S6. When the sensor voltage V2 is at the high level, it is determined that the vehicle is steered to the left, the sign of the steered system motor command value motor_req is inverted (step S5), and then the process proceeds to step S6. In step S6, the drive control is executed on the steered system motor M on the basis of the steered system motor command value motor_req. Note that, in step S3, when the sensor voltages V1, V2 of a direction detection mechanism 40 are both at the low level, it is determined that the steering position is neutral or closer to neutral, and drive control on the steered system motor M is not executed.

Figure 10:
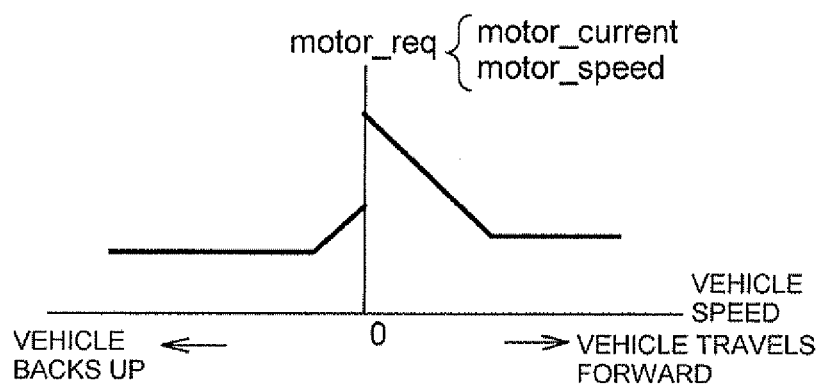
FIG. 10 is a graph for illustrating a method of calculating a steered system motor command value for driving a steered system motor on the basis of a vehicle speed.

FIG. 10 is a graph for illustrating a method of calculating the steered system motor command value motor_req for driving the steered system motor M on the basis of the vehicle speed. The steered system motor command value motor_req takes the maximum value when the vehicle travels forward and the vehicle speed is 0, decreases with an increase in vehicle speed, and is maintained at the minimum value when the vehicle speed is higher than or equal to a certain value. This is because a larger force is required in order to steer tires as the vehicle speed decreases and, therefore, the steered system motor command value motor_req is increased to smoothly steer the tires. Further, the command value is increased when the vehicle travels at a low speed at which high-speed steering is less likely to pose a danger; whereas the command value is decreased when the vehicle travels at a high speed. In this way, it is possible to achieve both safety and steering efficiency.

When the vehicle backs up, the steered system motor command value motor_req takes the maximum value when the vehicle speed is 0, decreases with an increase in vehicle speed, and is maintained at the minimum value when the vehicle speed is higher than or equal to a certain value. However, the absolute value of the steered system motor command value motor_req is set smaller than that when the vehicle travels forward. This is because, when the same steered system motor command value motor_req as that when the vehicle travels forward is used when the vehicle backs up, the vehicle is steered excessively when backing up and the steering efficiency decreases. In addition, when the vehicle backs up, the visibility is less than that when the vehicle travels forward. Therefore, rapid steering is avoided to increase the safety.

As described above, with the method of calculating the steered system motor command value motor_req, in normal times, it is possible to steer the steered wheels with the use of the steered mechanism A on the basis of the steering angle of the steering member 2. When an abnormality occurs in the steering angle sensor 12, it is possible to control the steered system motor M on the basis of the steered system motor command value motor_req for controlling the steered system motor M, which is determined on the basis of the detection signal from the rotation restriction mechanism 70 that detects the steering direction. Thus, even if a fail-safe steering angle sensor is not provided as a spare, it is possible to continue steering.

As described above, the rotation restriction mechanism 70 is a mechanism that is provided in order to restrict the rotation angle of the steering member 2 such that the rotation angle is equal to or smaller than the predetermined angle corresponding to operation limits so that the steering member 2 is not operated beyond the operation limits of the steered mechanism A in the vehicle steering system 1. In the embodiment of the invention, it is possible to detect the rotation direction of the steering member 2 with a simple structure in which the rotation restriction mechanism 70 includes the light projecting units 91, 92 and the light receiving units 101, 102 and the transmission holes 93, 94 are formed in the plate element 84.

The embodiment of the invention is described above. However, the invention is not limited to the above-described embodiment. Various modifications may be made within the scope of the invention. For example, the transmission holes 93, 94 formed in the plate element 84 need not be in the shape of holes, and may be in any shape that allows transmission of light. For example, cutouts formed in the plate element 84 may be employed. In addition, the plate element in which the light transmission portions are formed is not limited to the plate element 84 that is closest to the non-rotatable element, and may be any plate element that is present between the rotatable element and the non-rotatable element. For example, the plate element in which the light transmission portions are formed may be the plate element 81, 82 or 83.

What is claimed is:
1. A vehicle steering system comprising:
   a steering mechanism having a steering member that is subjected to multiple rotation operation for steering and a steering angle detection sensor;

a steered mechanism that is not mechanically coupled to the steering mechanism;

a control unit that controls a steered system motor of the steered mechanism;

a rotation restriction mechanism that restricts a rotation amount of the steering member such that the rotation amount is equal to or smaller than a predetermined angle, wherein the rotation restriction mechanism includes: a rotatable element that is coaxially rotatable together with a rotary shaft of the steering member; a non-rotatable element that faces the rotatable element in an axial direction of the rotary shaft; at least one plate element that is interposed between the rotatable element and the non-rotatable element, that is coaxially supported by the rotary shaft, and that is rotatable with respect to the rotary shaft; and a coupling element that couples adjacent elements among the non-rotatable element, the at least one plate element and the rotatable element so as to restrict an amount of relative rotation between the adjacent elements, the rotation restriction mechanism being configured such that the rotation amount of the steering member is equal to or smaller than the total amount of relative rotation between the adjacent elements;

a light projecting unit provided at one of the rotatable element and the non-rotatable element; and a light receiving unit provided at the other one of the rotatable element and the non-rotatable element, wherein the at least one plate element is arranged so as to block light that is emitted from the light projecting unit toward the light receiving unit, and has a light transmission portion that allows transmission of light that is emitted from the light projecting unit and that enters the light receiving unit when a rotation angle of the at least one plate element is a predetermined angle.

2. The vehicle steering system according to claim 1, wherein a plurality of the plate elements are interposed between the rotatable element and the non-rotatable element.

3. The vehicle steering system according to claim 2, wherein the plate element other than the plate element that has the light transmission portion is smaller in diameter than the plate element that has the light transmission portion so as not to block light that is emitted from the light projecting unit and that enters the light receiving unit.

4. The vehicle steering system according to claim 1, wherein, when a malfunction occurs in the steering angle detection sensor, the control unit controls the steered system motor based on a steered system motor command value for controlling the steered system motor, which is determined based on a detection signal from the light receiving unit.

5. The vehicle steering system according to claim 1, wherein:
- the steering member is not mechanically coupled to a steered wheel;
- the vehicle steering system further comprises a reaction motor that includes a rotor that rotates together with the rotary shaft, and that applies steering reaction force to the steering member; and
- the reaction motor and the rotation restriction mechanism are accommodated in a single housing.

* * * * *